United States Patent
Yim et al.

(10) Patent No.: US 6,178,062 B1
(45) Date of Patent: Jan. 23, 2001

(54) BALANCE TUBE FOR A SPINDLE MOTOR ASSEMBLY OF A HARD DISK DRIVE

(75) Inventors: Pyongwon Yim; Hae Sung Kwon, both of Sunnyvale; Tho Pham, Milpitas; Hyung Jai Lee, Cupertino, all of CA (US)

(73) Assignee: Samsung Electronics Company, Ltd., Suwon (KP)

( * ) Notice: Under 35 U.S.C. 154(b), the term of this patent shall be extended for 0 days.

(21) Appl. No.: 09/118,593

(22) Filed: Jul. 17, 1998

(51) Int. Cl.[7] .................................................. G11B 17/08
(52) U.S. Cl. ............................................................ 360/98.07
(58) Field of Search ........................... 360/98.07, 98.08, 360/99.08, 97.01, 97.02; 384/113, 133

(56) References Cited

U.S. PATENT DOCUMENTS

| | | | |
|---|---|---|---|
| 4,819,105 | * 4/1989 | Edwards | 360/98.08 |
| 5,161,900 | * 11/1992 | Bougathou et al. | 384/133 |
| 5,202,803 | * 4/1993 | Albrecht et al. | 360/97.02 |
| 5,885,005 | * 3/1999 | Nakano et al. | 384/113 |

* cited by examiner

*Primary Examiner*—Allen T. Cao
(74) *Attorney, Agent, or Firm*—Irell & Manella LLP; Jeffrey Aiello

(57) ABSTRACT

A spindle motor assembly for a hard disk drive which has a fluid filled tube that dynamically balances the spindle motor. The assembly may include a hub which is rotated by an internal motor. A plurality of disks may be coupled to the hub and separated by a number of spacers. In one embodiment, the fluid filled tube is attached to the hub. In another embodiment, the fluid filled tube is attached to the spacer. The fluid within the tube is allowed to move during rotation of the hub. Movement of the fluid may dynamically balance the spindle motor.

15 Claims, 2 Drawing Sheets

BALANCE TUBE FOR A SPINDLE MOTOR ASSEMBLY OF A HARD DISK DRIVE

BACKGROUND OF THE INVENTION

1. Field of the Invention

The present inventions relates to data storage devices and more particularly to a spindle motor assembly for a hard disk drive.

2. Background Information

Hard disk drives contain one or more magnetic heads which magnetize and sense the magnetic field of a rotating disk. The magnetization of the disk typically corresponds to a series of digital bits. The digital bits are typically arranged within concentric tracks that extend radially across the disk. Each track may contain a number of sectors. Each sector may contain a servo field, an identification field, a data field and an error correction code field.

The heads are typically mounted to an actuator arm that is pivotally attached to a base plate of the disk drive. The actuator arm may include a voice coil motor which can move the heads across the surfaces of the disk. The voice coil motor is connected to control circuitry which can move the heads from one track to another track of the disk. The control circuitry utilizes the servo field of each sector to maintain the head at the centerline of the track. A deviation from the centerline may create errors in reading or writing data from the disk.

The disk is rotated by a spindle motor which is mounted to the base plate. The spindle motor typically includes a hub that supports one or more disks. Within the hub is an electric motor which spins the disks. The disks may be separated by an annular spacer(s) and coupled to the hub by a clamp ring.

The spindle motor may have a dynamic imbalance which causes the disks to "wobble" during rotation. The wobble may be created during an assembly process wherein the disk is not concentrically mounted to the hub of the spindle motor. The wobble moves the track relative to the heads. Such a phenomenon is typically referred to as a "run-out" of the disks.

The aerial density of a disk is somewhat defined by the spacing between adjacent tracks. Disk drives with disk run-out require larger track to track spacing to compensate for the relative movement between the heads and the disk. This larger track to track spacing reduces the data storage capacity of the disk, and the hard disk drive. It is therefore desirable to minimize the wobble of the spindle motor and the run-out of the disk.

Some disk drive manufacturers attempt to dynamically balance the spindle motor by placing each motor on a spin stand and then add counterweights to the hub until the assembly is in balance. The counterweights may be set screws that are attached to the hub. Such a procedure is time consuming and adds to the complexity and cost of mass producing hard disk drives. It would be desirable to provide a hard disk drive that is dynamically balanced without the use of rigid counterweights.

SUMMARY OF THE INVENTION

One embodiment of the present invention is a spindle motor assembly for a hard disk drive which has a fluid filled tube that dynamically balances the spindle motor. The assembly may include a disk that is coupled to a hub. The hub may be rotated by a motor. The fluid filled tube may be coupled to the hub.

DETAILED DESCRIPTION OF THE INVENTION

One embodiment of the present invention is a spindle motor assembly for a hard disk drive which has a fluid filled tube that dynamically balances the spindle motor. The assembly may include a hub which is rotated by an internal motor. A plurality of disks may be coupled to the hub and separated by a number of spacers. In one embodiment, the fluid filled tube is attached to the hub. In another embodiment, the fluid filled tube is attached to a spacer. The fluid within the tube is allowed to move during rotation of the hub. Movement of the fluid may dynamically balance the spindle motor.

Figure 1:
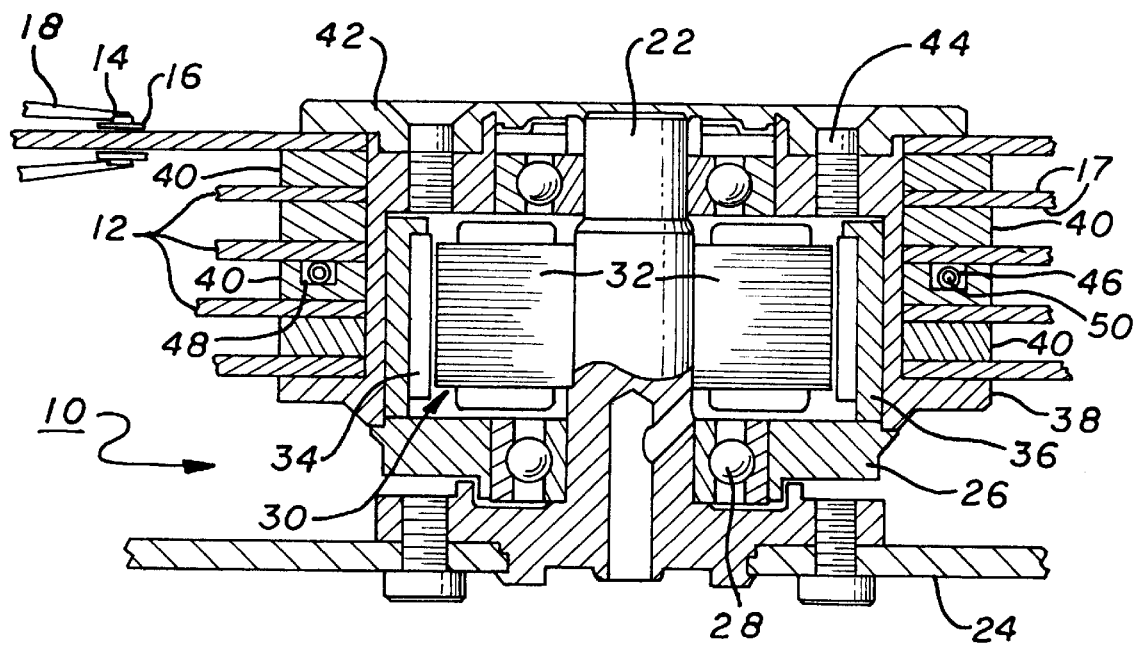
FIG. 1 is a cross-sectional view of an embodiment of a spindle motor assembly of the present invention.

Referring to the drawings more particularly by reference numbers, FIG. 1 shows an embodiment of a spindle motor assembly 10 for a hard disk drive constructed according to the principles of the present invention. The disk drive may include a plurality of magnetic disks 12 coupled to the motor assembly 10. The disk drive may also contain a plurality of magnetic read/write heads 14 for reading and writing data stored on the disk 12. The heads 14 may each include a transducer(s) 16 that magnetizes and senses the magnetic field of the disks 12. There may be a head 14 located adjacent to each surface 17 of the disks 12.

The spindle motor 10 rotates the disks 12 relative to the heads 14. Each read/write head 14 may be mounted to a flexure arm 18 that is attached to an actuator arm (not shown). The actuator arm may have a voice coil motor (not shown) that moves the heads 14 across the surfaces of the disks 12.

The spindle motor 10 may have a spindle 22 that is mounted to a base plate 24 of the disk drive. The spindle 22 may be coupled to a hub 26 by a plurality of bearings 28. The hub 26 may be rotated by an internal motor 30. The motor 30 may include a coil 32 that is coupled to a plurality of magnets 34 that are attached to the hub 26 by a plate 36. The coil 32 is typically connected to a control circuit (not shown) which provides an electrical current. The current generates an electrical field that cooperates with the magnets 34 to rotate the hub 26.

One of disks 12 may be mounted to an outer collar 38 of the hub 26. The disks 12 may be separated from each other by a plurality of spacers 40. The disks 12 and spacers 40 may be pressed into the collar 38 by a clamp ring 42 that is attached to the hub 26 by fasteners 44.

Figure 2:
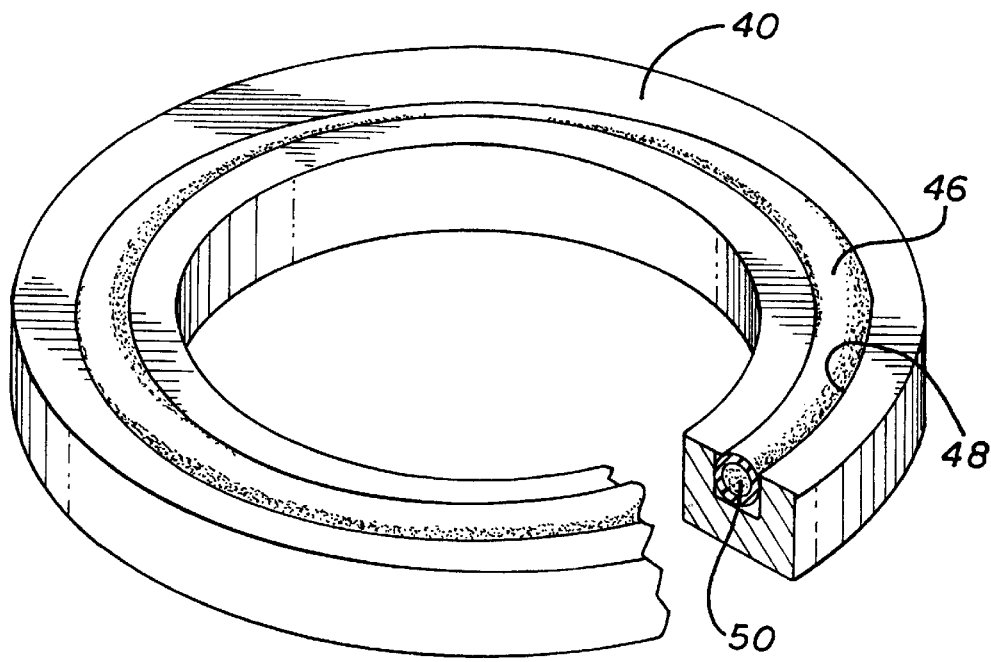
FIG. 2 is a perspective view of a spacer of the spindle motor.

As shown in FIGS. 1 and 2, the assembly 10 may include a fluid filled tube 46 that is located within a groove 48 of a spacer 40. The tube 46 may have an inner annular passage 50 that is filled with a fluid. The tube 46 may be constructed from an elastomeric material such as a silicone rubber. The tube 46 may be filled with any liquid material. In one embodiment, the fluid may have a volume that is less than the volume of the passage 50 so that the fluid can readily flow within the tube 46. Additionally, the elastomeric tube 46 may expand during the rotational flow of the fluid. During rotation of the hub 26, the fluid can flow within the tube 46 to counterbalance any dynamic imbalance in the motor assembly 10.

Figure 3:
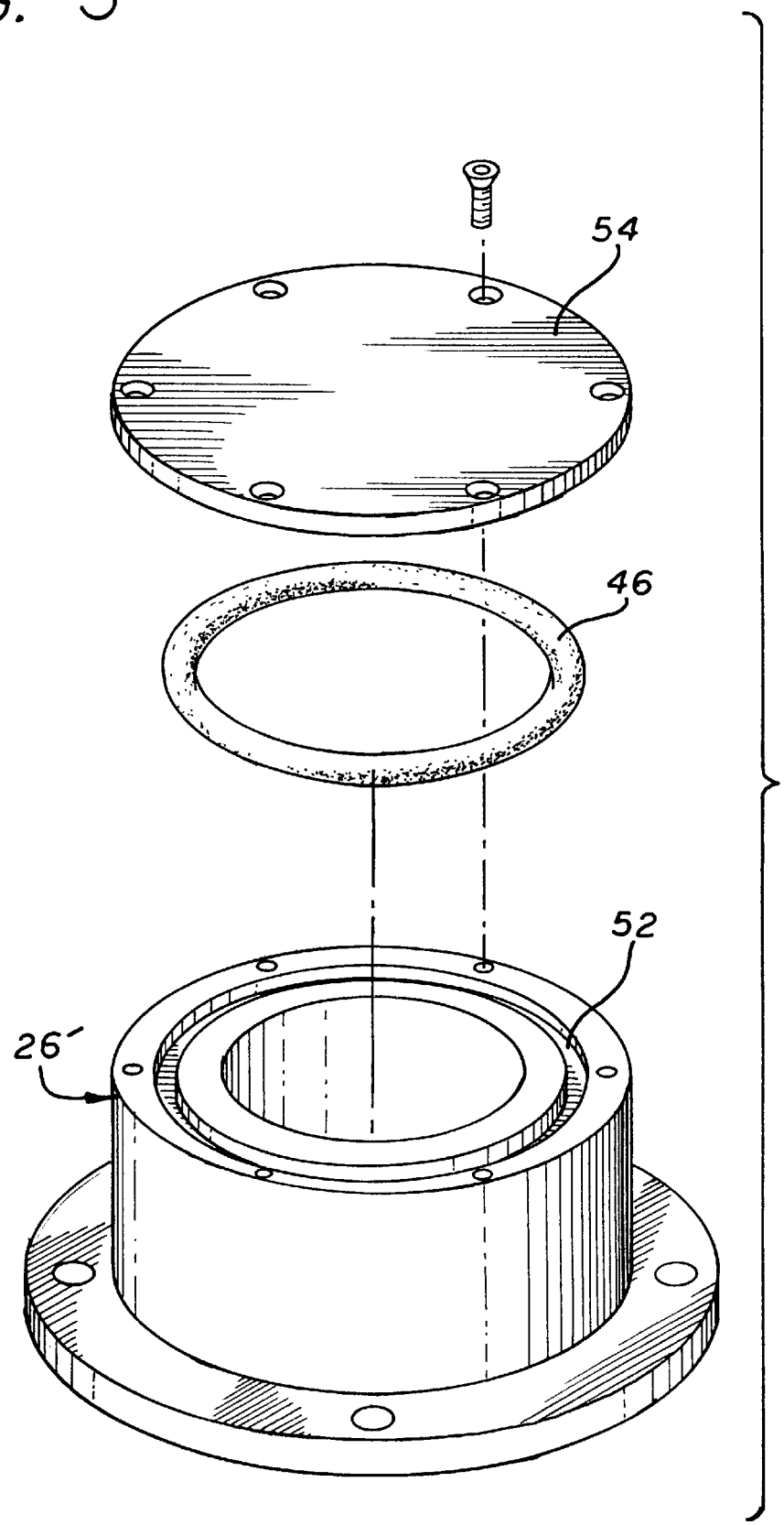
FIG. 3 is a perspective view of an alternate embodiment of the spindle motor.

FIG. 3 shows an alternate embodiment, wherein the fluid filled tube 46 is located within a groove 52 of a hub 26'. The tube 46 may be enclosed by a lid 54 that is attached to the hub 26'.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A spindle motor assembly for a hard disk drive, comprising:

a hub;

a motor which rotates said hub;

a first disk coupled to said hub;

a second disk couples to said hub;

a spacer that separates said first disk from said second disk; and, a sealed fluid filled tube coupled to said spacer, said sealed fluid filled tube having an outer wall that encloses a fluid and provides a seal even when said sealed fluid filled tube is separate from said spacer.

2. The assembly of claim 1, wherein said fluid filled tube is located within a groove of said spacer.

3. The assembly of claim 1, wherein the tube has an inner passage and wherein a volume of fluid within the inner passage is less than the volume of the passage.

4. The assembly of claim 3, wherein the volume of fluid within the inner passage of the tube is less than the volume of the passage to enable fluid to flow within the passage.

5. The assembly of claim 2, wherein the tube comprises an elastomeric material.

6. A spindle motor assembly for a hard disk drive, comprising:

a hub;

a motor which rotates said hub;

a first disk coupled to said hub; and a sealed fluid filled tube coupled to said hub, said sealed fluid filled tube having an outer wall that encloses a fluid and provides a seal even when said sealed fluid filled tube is separate from said hub.

7. The assembly of claim 6, wherein said fluid filled tube is located within a groove of said hub.

8. The assembly of claim 6, further comprising a lid that is attached to said hub and which encloses said fluid filled tube.

9. The assembly of claim 6, further comprising a second disk coupled to said hub.

10. The assembly of claim 9, further comprising a spacer that separates said first disk from said second disk.

11. The assembly of claim 6, wherein the tube has an inner passage and wherein a volume of fluid within the inner passage is less than the volume of the passage to enable fluid to flow readily within the passage.

12. A method for assembling a spindle motor assembly, comprising:

coupling a sealed fluid filled tube to a hub; and, coupling a disk to the hub.

13. The method of claim 12, wherein the fluid filled tube is coupled to the hub by attaching the fluid filled tube to a spacer and attaching the spacer to the hub.

14. The method of claim 12, wherein the fluid filled tube is coupled to the hub by performing the steps of:

forming a groove in the hub; and disposing the fluid tube in the groove.

15. The method of claim 13, wherein the tube has an inner passage and wherein a volume of fluid within the inner passage is less than the volume of the passage to enable fluid to flow within the passage as the hub is rotated.

* * * * *